United States Patent
Dullien et al.

[11] Patent Number: 6,149,697
[45] Date of Patent: Nov. 21, 2000

[54] REMOVAL OF SUSPENDED FINE PARTICLES FROM GASES BY TURBULENT DEPOSITION

[75] Inventors: Francis A. L. Dullien, 36, Stoke Drive, Kitchener, Ontario, Canada, N2N 1Z4; Jean-Charles Viltard, Valence, France

[73] Assignees: Francis A. L. Dullien, Ontario, Canada; Institut Francais du Petrole, Cedex, France

[21] Appl. No.: 09/351,127

[22] Filed: Jul. 12, 1999

Related U.S. Application Data

[62] Continuation of application No. 08/942,687, Sep. 29, 1997, Pat. No. 6,068,674, which is a continuation of application No. 08/406,393, Mar. 20, 1995, abandoned, which is a continuation-in-part of application No. 08/290,883, filed as application No. PCT/EP93/00392, Feb. 18, 1993, abandoned.

[30] Foreign Application Priority Data

Feb. 18, 1992 [GB] United Kingdom ............... 92/03.437

[51] Int. Cl.⁷ .................................................. B01D 39/00
[52] U.S. Cl. ......................... 55/308; 55/440; 55/473; 96/67; 96/390
[58] Field of Search ............................... 55/307, 308, 437, 55/440, 442, 464, 473, 476, 477, 482, 497, DIG. 39, DIG. 44; 96/67, 129, 390, 391, 392, 393, 394, 395

[56] References Cited

U.S. PATENT DOCUMENTS

| | | | |
|---|---|---|---|
| 1,898,591 | 2/1933 | Mohler et al. | 55/440 |
| 2,527,392 | 10/1950 | Bradshaw | 55/308 |
| 2,896,743 | 7/1959 | Bradshaw | 55/308 |
| 3,487,610 | 1/1970 | Brown et al. | 96/390 |
| 3,616,623 | 11/1971 | Reid | 55/440 |
| 4,047,894 | 9/1977 | Kuhl | 95/236 |
| 4,364,730 | 12/1982 | Gustafsson | 55/440 |
| 4,627,861 | 12/1986 | Ibaraki et al. | 96/393 |
| 6,068,674 | 5/2000 | Dullien et al. | 55/308 |

FOREIGN PATENT DOCUMENTS

| | | |
|---|---|---|
| 429327 | 1/1948 | Italy . |
| 632360 | 11/1949 | United Kingdom . |

*Primary Examiner*—C. Scott Bushey
*Attorney, Agent, or Firm*—Antonelli, Terry, Stout & Kraus, LLP

[57] ABSTRACT

An apparatus for removing particles from a fluid stream includes an unobstructed channel for conveying a stream in turbulent flow and a series of objects extending at least along one side of the channel, the objects being closely spaced from each other in the direction of flow so as to define therebetween spaces in which eddies penetrate from the channel to cause collection of particles on surfaces of the objects upon decay of the eddies.

3 Claims, 13 Drawing Sheets

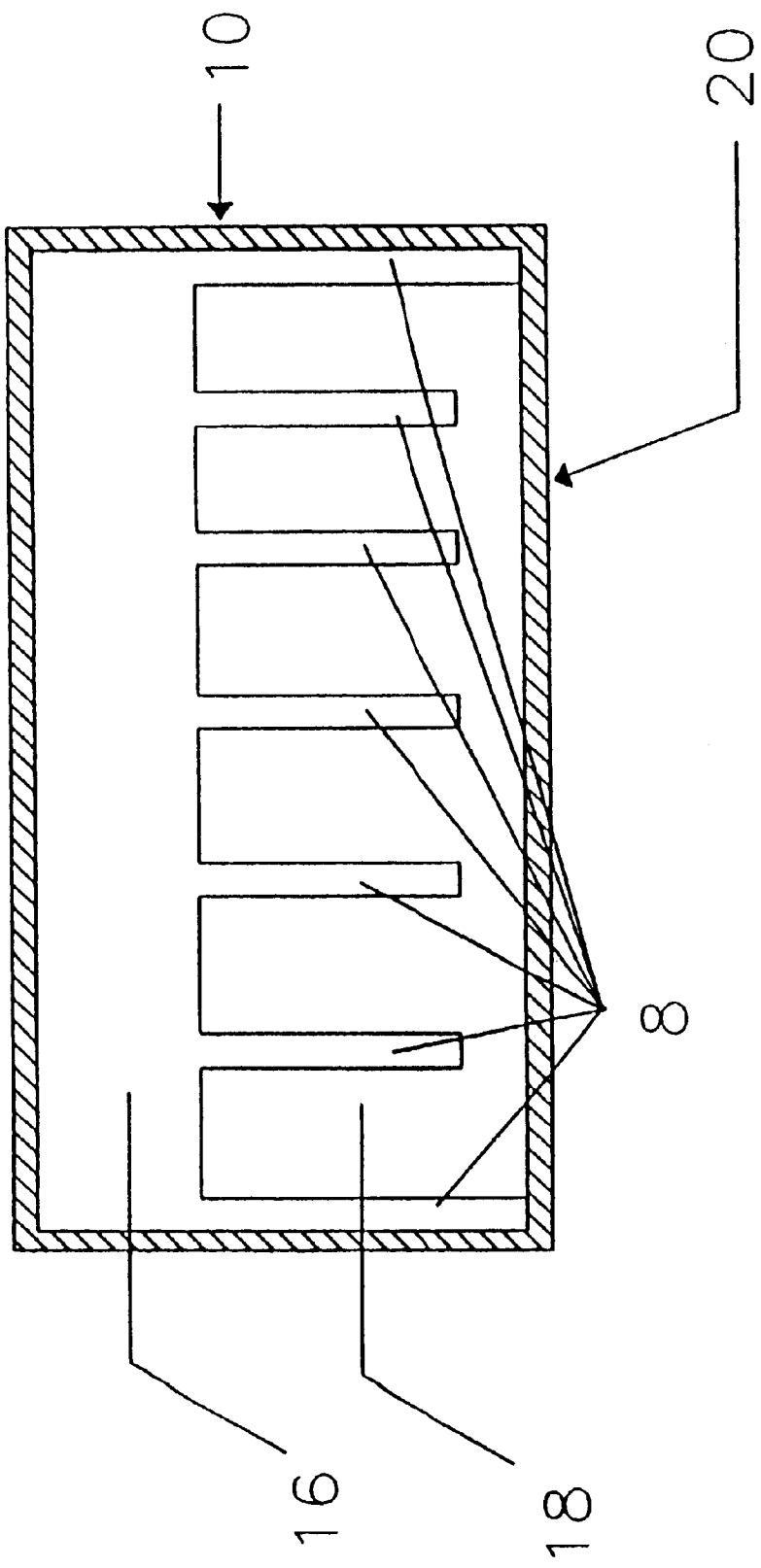

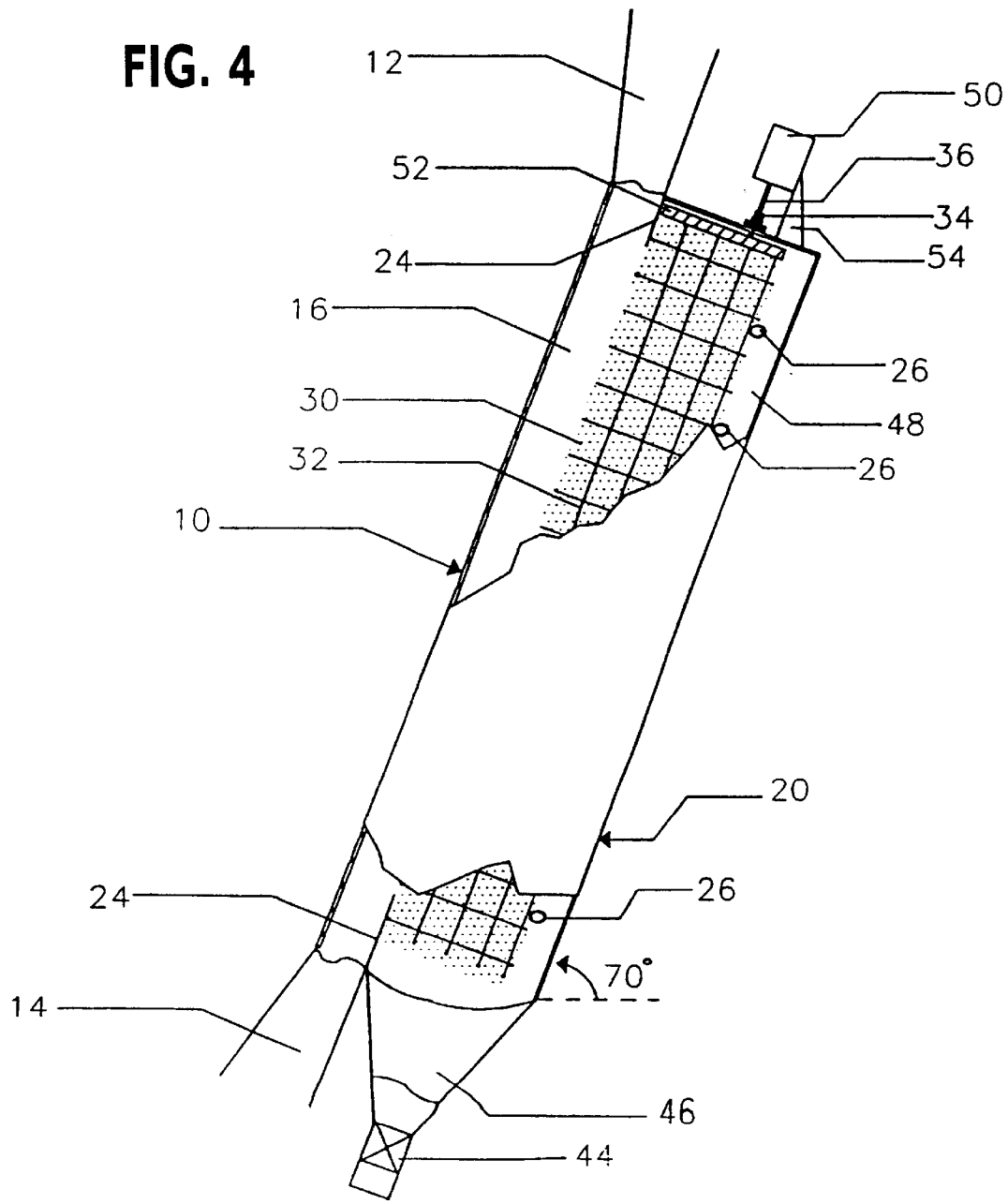

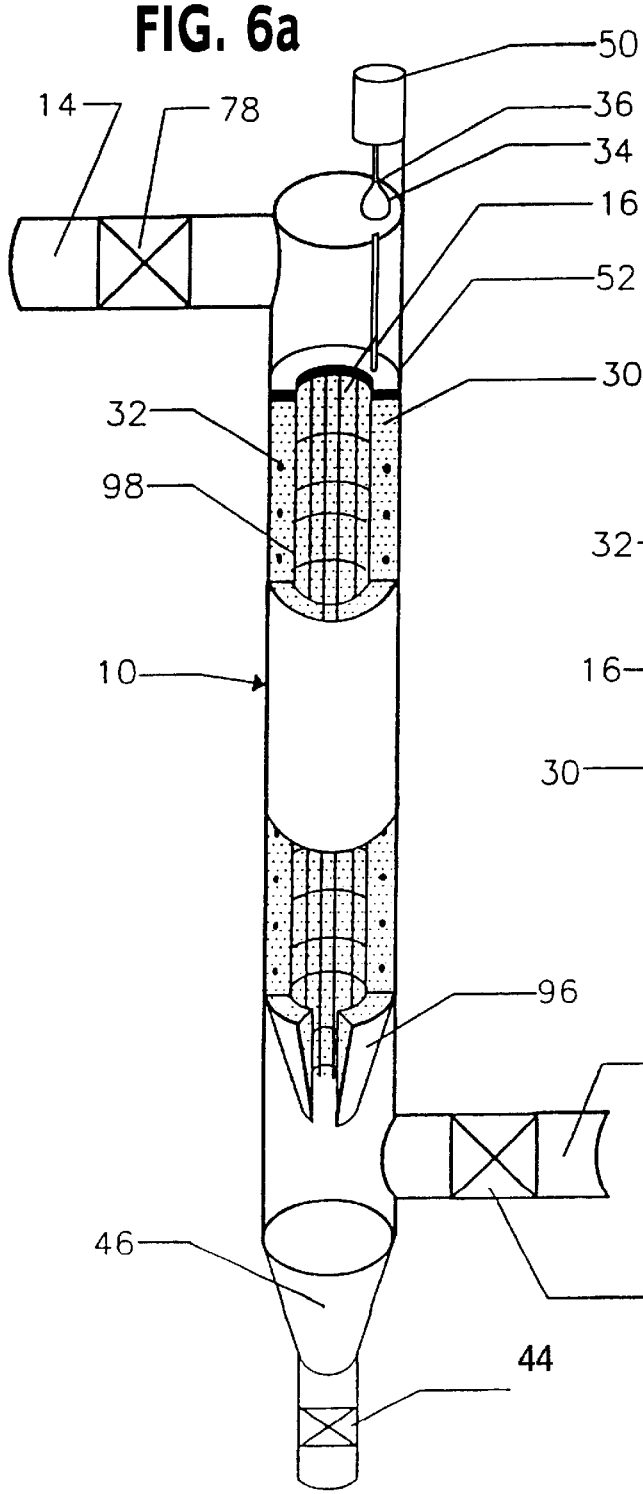
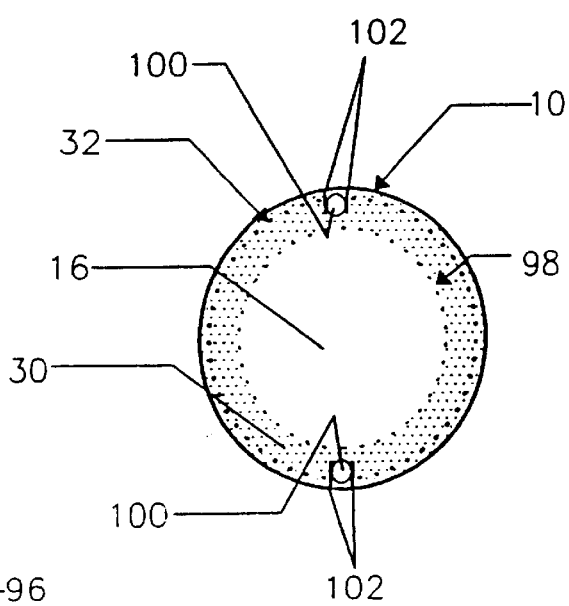

Cross Section C

Cross Section A

Cross Section B

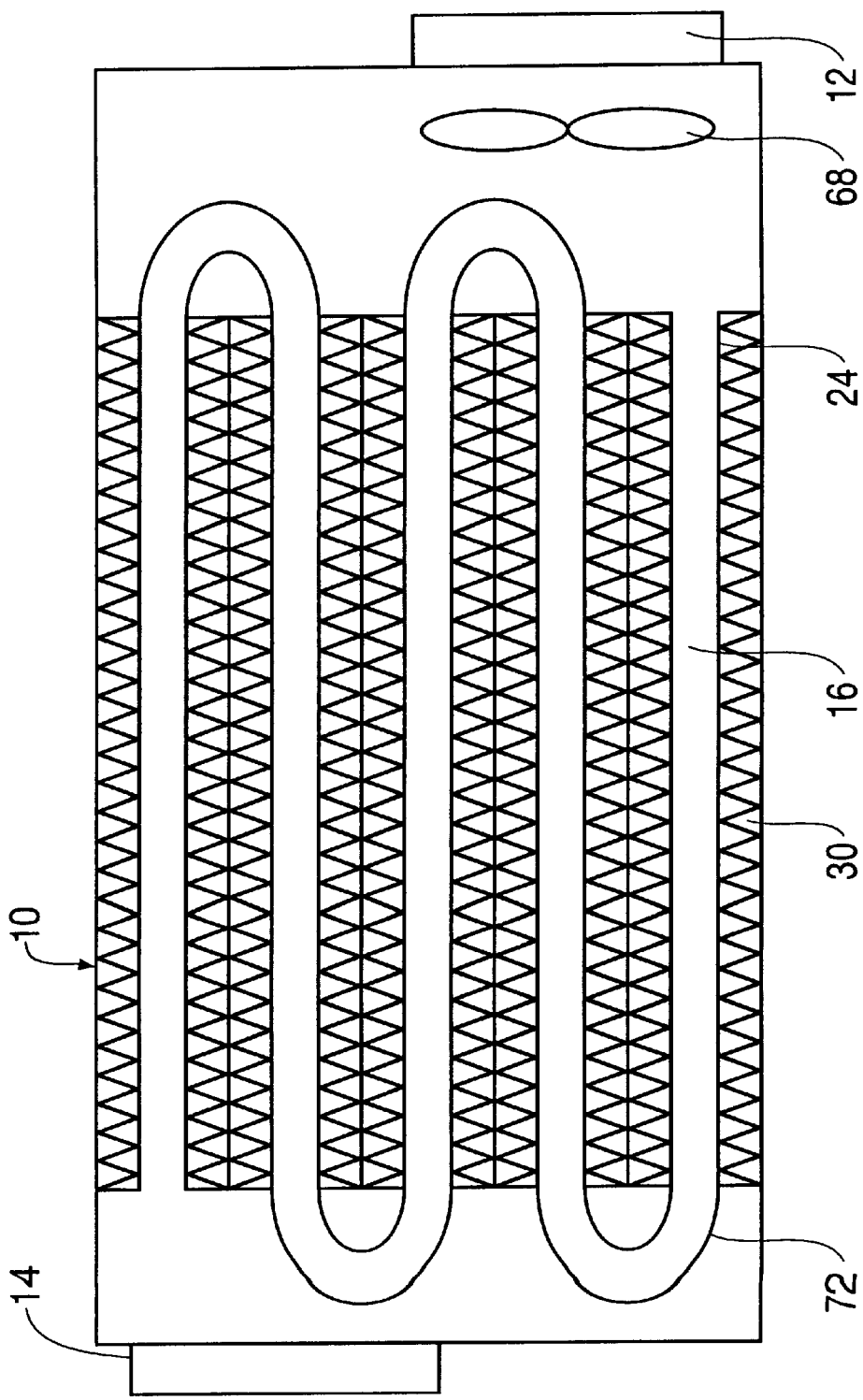

REMOVAL OF SUSPENDED FINE PARTICLES FROM GASES BY TURBULENT DEPOSITION

CROSS-REFERENCE TO RELATED APPLICATION

This application is a continuation application of Ser. No. 08/942,687, filed Sep. 29, 1997, now U.S. Pat. No. 6,068,674, which is a continuation of Ser. No. 08/406,393, filed Mar. 20, 1995, now abandoned, which is continuation-in-part application of application Ser. No. 08/290,883, filed on Sep. 13, 1994, now abandoned, which was the National Stage of International Application No. PCT/EP93/00342, filed Feb. 18, 1993.

BACKGROUND OF THE INVENTION

The present invention is directed to the removal of fine particles from gases. In particular, the present invention facilitates the separation and collection of particulate matter, such as dust, mist, fumes, smoke, and also of noxious gases etc., dispersed in a gas, in a state of turbulent flow, by taking advantage of certain effects associated with turbulence in a novel and particular way, using purely mechanical means.

It is well known to those skilled in the art of fluid mechanics and related fields of endeavour, that fine particles dispersed in a fluid in a turbulent state of flow tend to follow the eddies of the turbulent fluid.

The removal of very fine particles, typically in the range of about 0.01 to 100 microns, from industrial gases or ambient air, is a difficult and expensive operation to perform efficiently. Devices traditionally employed for this purpose involve electrostatic precipitators, a variety of filters, and wet scrubbers. Scrubbers are used also for the removal of noxious gases from industrial gases. Cyclone collectors have been traditionally used for the removal of particulate matter larger than about 5 microns, and a concerted effort has been made recently to extend their effective range down to about 1 micron particulate size.

In published International Patent Application WO93/15822 and corresponding U.S. application Ser. No. 08/290,883, filed Sep. 13, 1994, the disclosure of which is incorporated herein by reference, there is described a method for the removal of dispersed fine particulates from a fluid stream using the mixing effects of turbulence for the separation and collection of the fine particulates in a novel and specific way, by passing the fluid stream in a state of turbulent flow through a channel not containing any obstructions, alongside of which there is a region, freely communicating with the flow channel, in which the flow is hindered by a large number of objects, placed close to each other in the flow path, causing a change from turbulent to viscous flow. Turbulent eddies, carrying particulates, keep penetrating into this region, which forms an expanded viscous sublayer, and deposit their particulate matter on the surfaces of the objects present there. Retention of the particulates on the surfaces is enhanced if the objects are charged with static electricity. Devices operating on the above principles of particulate collection from fluid streams will be referred to as "turbulent flow precipitators".

In accordance with the present invention, there are provided means for effecting such particulate separation, not disclosed in WO93/15822. In all embodiments the mechanism whereby dust is collected is the same, i.e. turbulent deposition by eddy penetration. All embodiments described here, and their future modifications, are based on this principle, and the patent applies to all. Some means of recovering or removing the collected dust are described here, but are by no means the only methods of removing collected dust from the system. Some are based on purely physical means (utilising gravity), and some by mechanical means (such as louvred base, screw thread conveyor, conveyor belt, shaking mechanism, quick-return shaking, etc.) Some embodiments are useful for small scale applications (up to 500 acfm); some for mid-size (up to 5,000 acfm); and some may be modified for large industrial scale units; but all are based on the same underlying principle, that of turbulent deposition, as described here and in the patent application WO93/15822. Many of the embodiments can also be used, in addition to removing particulate matter, to eliminate noxious gases by means of either impregnating the collector surface with a suitable catalyst or an adsorbent such as active carbon, or by using a fine spray of water or suitable aqueous solution and injection of that into the turbulent gas stream, ahead of the collector device. In the first instance, the eddies keep transporting the noxious gas to the collector surface, where it reacts or gets adsorbed. In the second instance, the fine spray, after absorbing the noxious gas, is precipitated by turbulent deposition. In this case the turbulent flow precipitator is acting as a wet scrubber. Dry scrubbing is another field of application of the turbulent flow precipitator, where it can be used to collect dry particulates formed in the process. Some of the further means of particulate collection are described below with reference to the accompanying drawings, in which:

FIG. 1 is a front-elevational view of a plate positioned in a housing, employed in a first further means.

Figure 3:
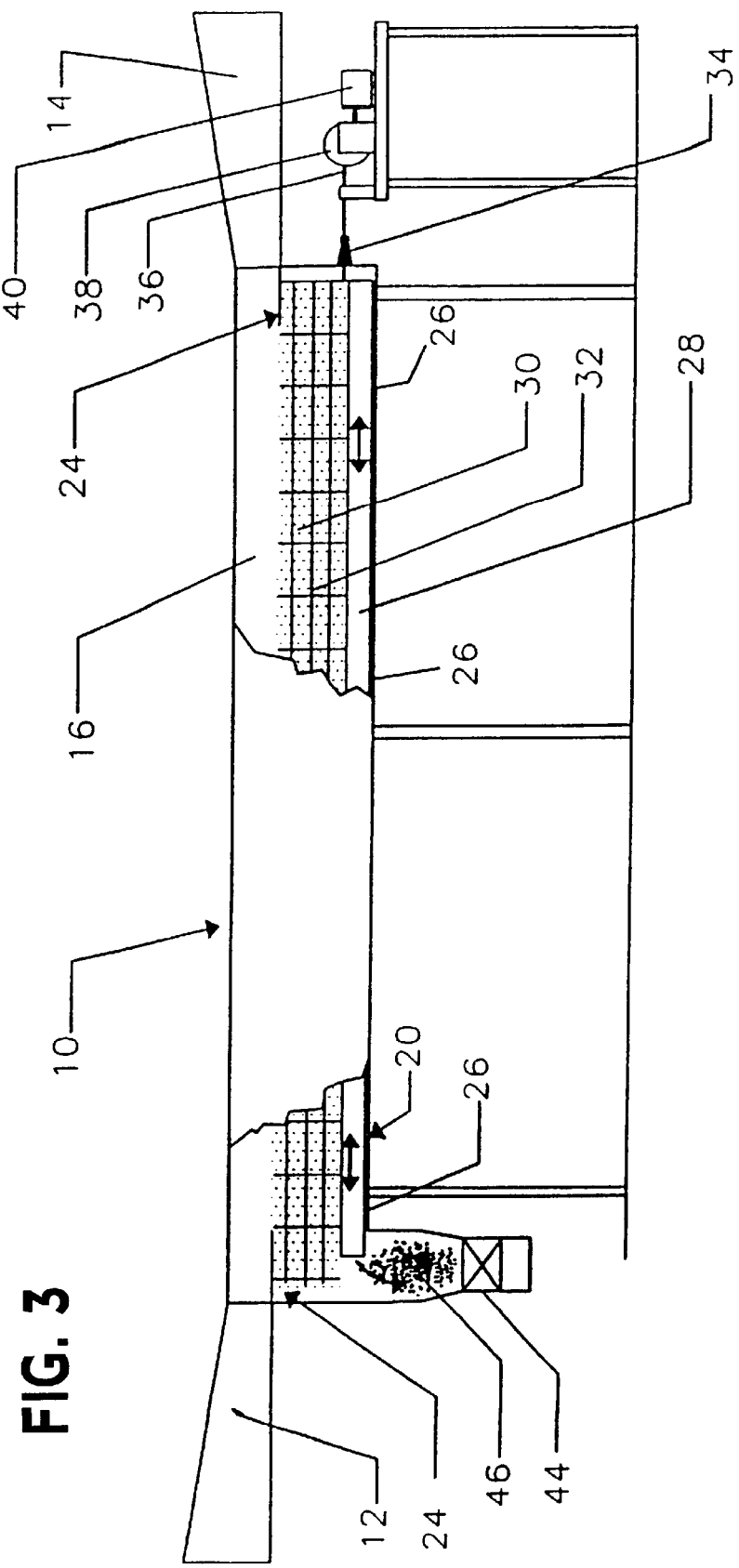

FIG. 3 contains a side-elevational view of a turbulent flow precipitator in accordance with one embodiment of a third further means;

FIG. 4 contains a side-elevational view with cutouts of a turbulent flow precipitator in accordance with a second embodiment of a third further means.

Figure 5A:
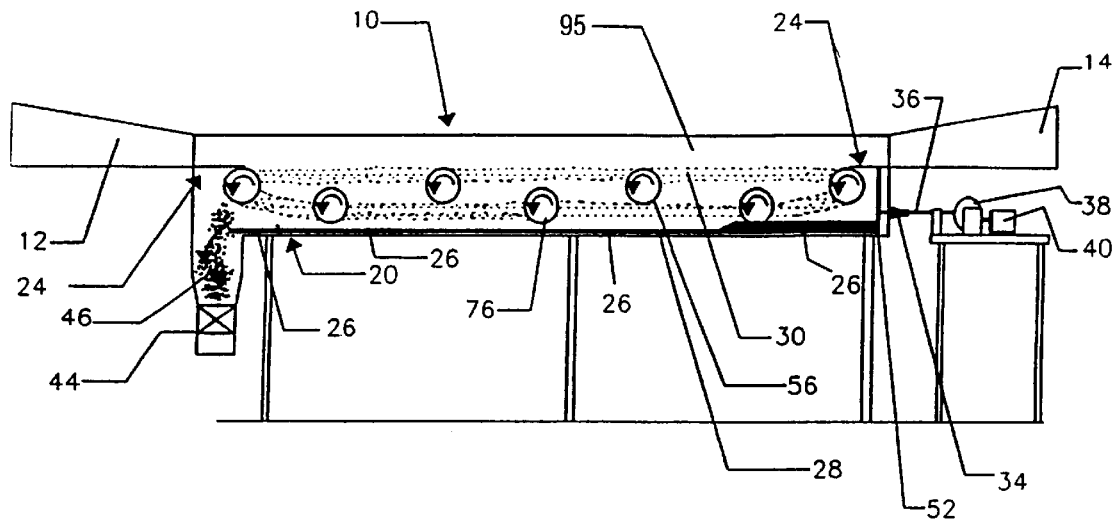
Figure 5B:
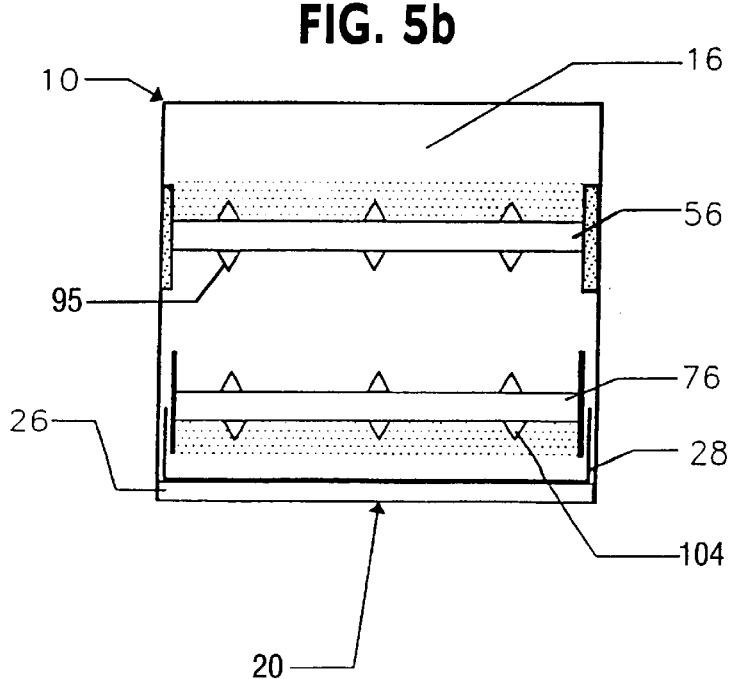

FIGS. 5a and 5b are views including a side-elevational view with cutouts(a) and a transverse cross-section (b) of a turbulent flow precipitator in accordance with a third embodiment of a third further means.

FIGS. 6a and 6b are views including a perspective view with cutouts (a) and a cross-sectional view perpendicular to the main axis (b) of a turbulent flow precipitator in accordance with a fourth embodiment of a third further means.

FIGS. 7a, 7b, 7c, 7d and 7e are views including two perspective views, one with cutouts (a), and the other showing the location of sections (b), a cross-sectional view along the main axis (c) and two cross-sectional views perpendicular to the main axis (d), of a turbulent flow precipitator in accordance with a fifth embodiment of a third further means.

Figure 8A:
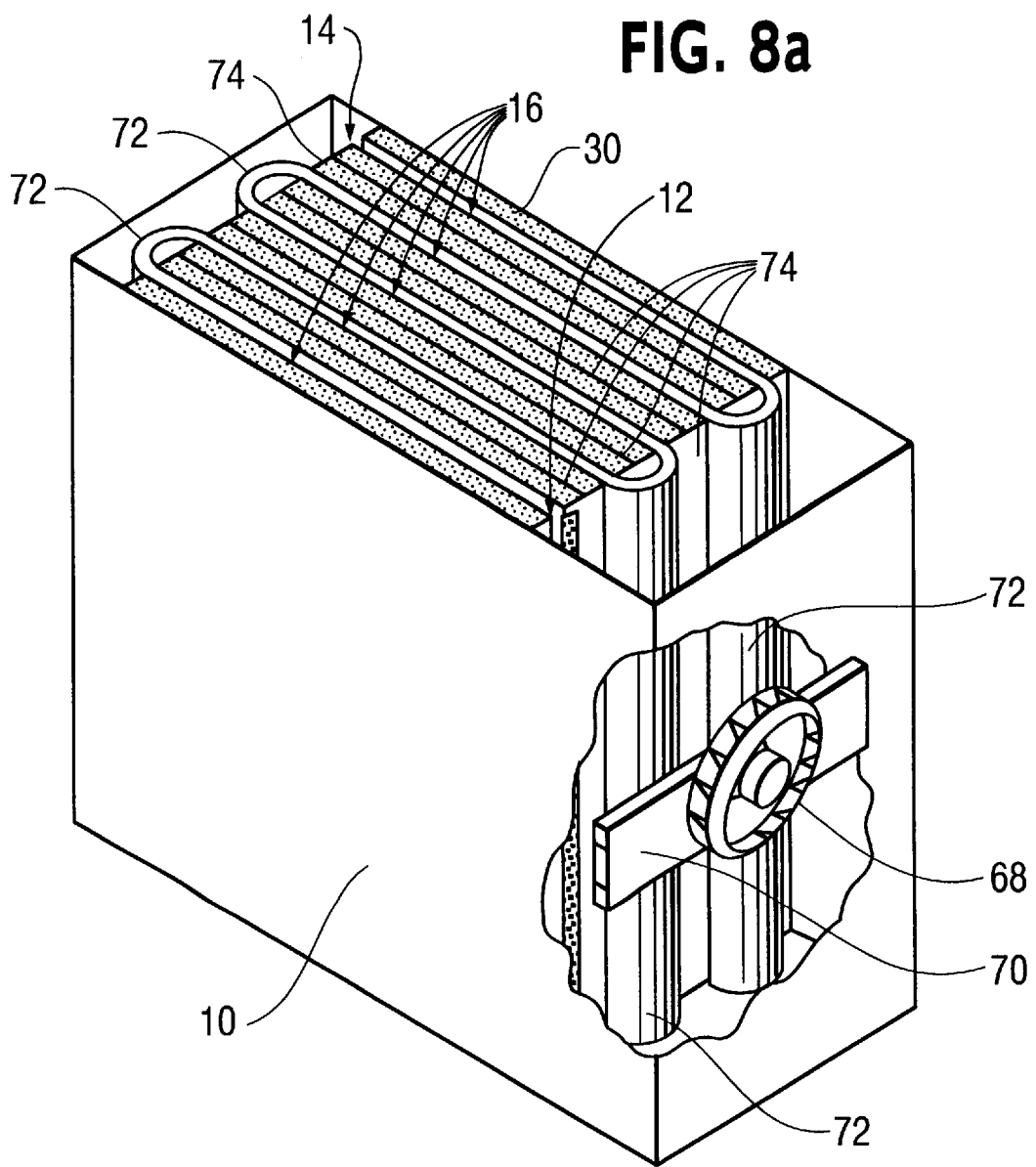

FIGS. 8a and 8b are views including a perspective view with cutouts (a) and a horizontal cross-sectional view (b) of a turbulent flow precipitator in accordance with a sixth embodiment of a third further means.

Figure 9:
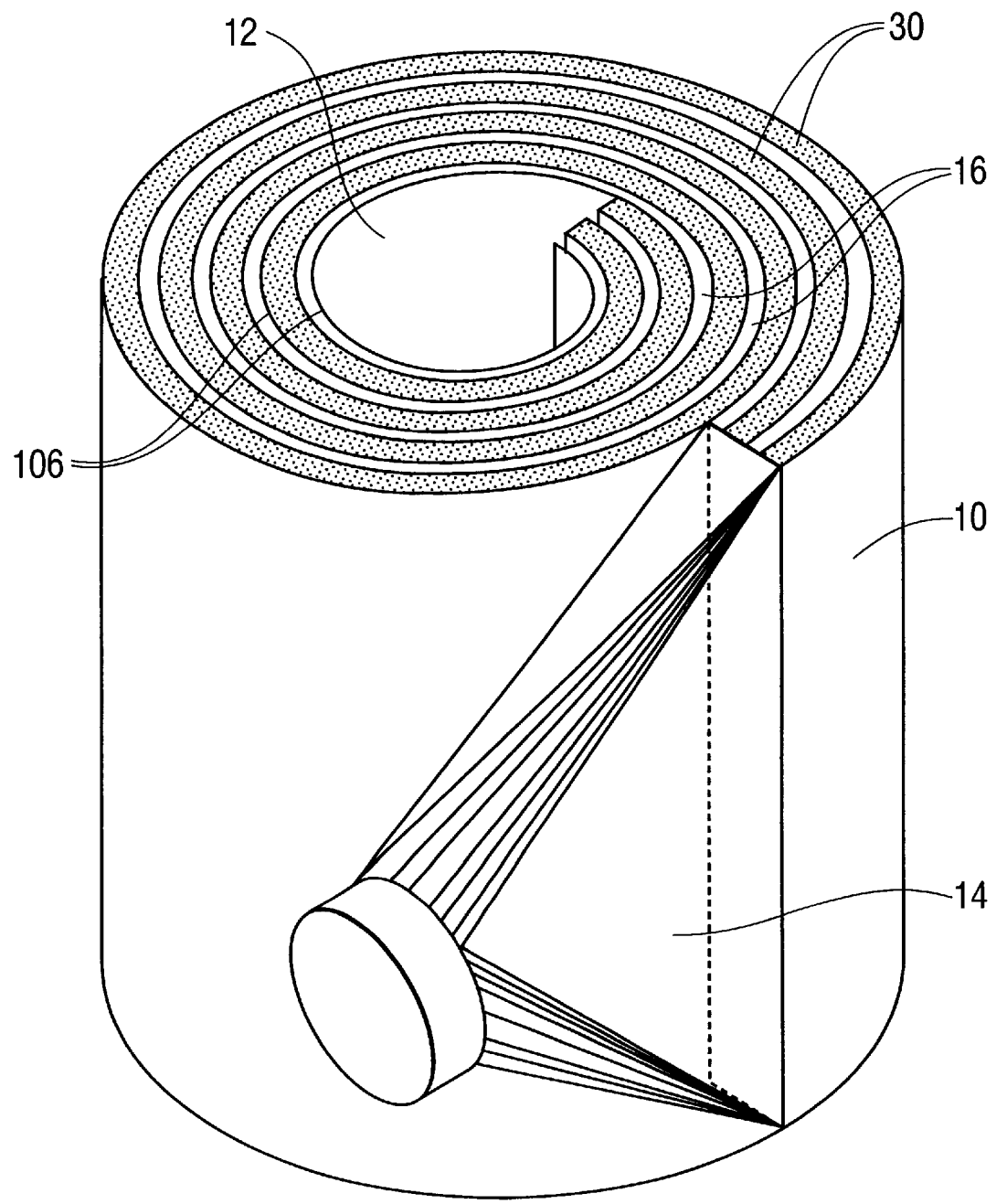

FIG. 9 contains a perspective view with cutouts of a turbulent flow precipitator in accordance with a seventh embodiment of a third further means.

1. First Further Means, FIG. 1.

In a first further means, shown schematically in FIG. 1, a relatively large number of plates 18 can be placed one behind the other transversely of the housing 10, either standing on the bottom of the housing, as disclosed in WO93/15822, or with a space between the bottom 20 of the housing 10 and the bottom edges of the plates 18. The gas flows in channel 16 in a turbulent state. In some or all of the plates, a plurality of slots 8 is provided, aligned one behind the other, forming spaces which may be termed "canyons", running through the set of plates 18. The width of each of the slots or canyons may vary widely but preferably it is in the range of about 3 mm to 10 mm. The spacings between the slots or canyons in the plates may also vary widely but preferably it is about 1 cm to about 30 cm. In experiments with ASP 200 test dust dispersed to a median particle diameter of 1.8 μm, width of housing 10 of 61 cm, height of gas flow channel 16 of 5 cm, plate spacing of 4 cm, plate height of 15 cm, gas velocity between 12 ms$^{-1}$, and 18 ms$^{-1}$, precipitator length of 3.4 m, the collection efficiency with plates without "canyons" was 48%, whereas with plates containing 13 "canyons" of 3 mm width, the efficiency increased to 62%.

2. Second Further Means, FIG. 2

Figure 2A:
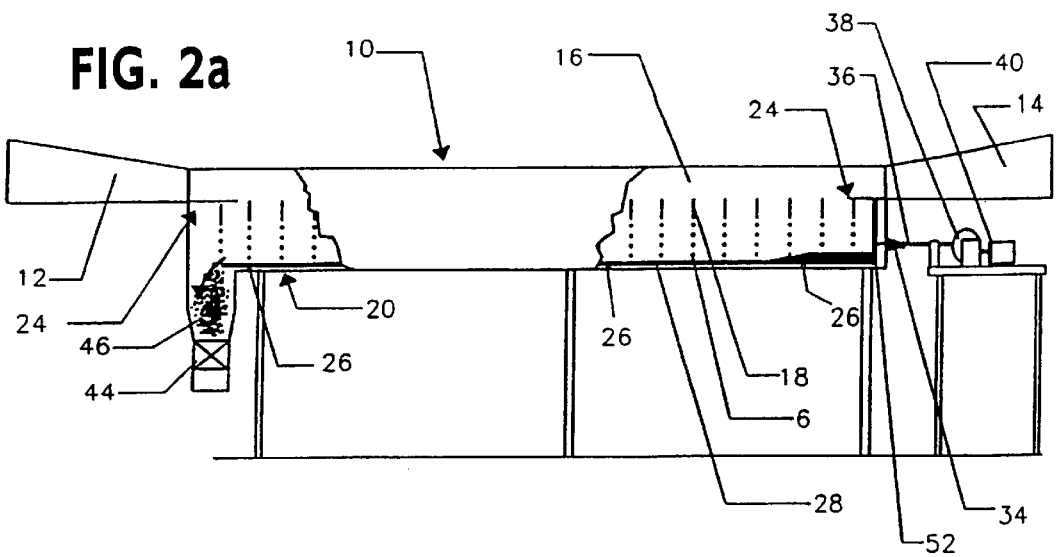
FIGS. 2a, 2b and 2c are views including a side-elevational view with cutouts (a) of a turbulent flow precipitator in accordance with a second further means, the quick return shaking mechanism (b) and a front elevation (c) of a screen plate and the dust removal tray positioned in the housing.
Figure 2B:
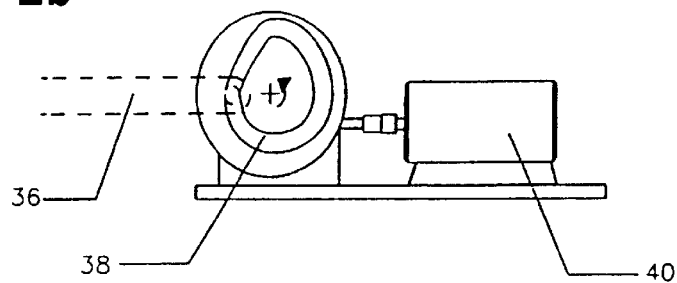
Figure 2C:
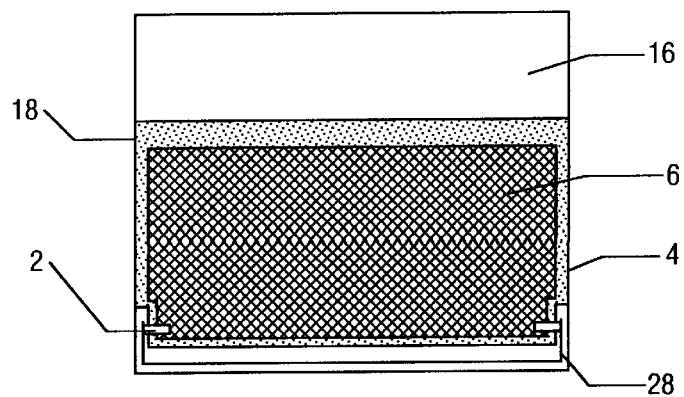

In a second further means for effecting particulates separation, illustrated in FIG. 2, instead of the plurality of closely-spaced transverse plates, disclosed in WO93/15822, there may be employed a relatively large number of mesh screens 6, each supported by a frame 4, placed one behind the other, with a space of about 0.5 cm to 2 cm left between the bottom of the dust removal tray 28, resting on sliders 26 attached to the bottom of the duct, and the bottom edge of a screen. Pins 2 are attached to the sides of tray 28 to rap the screens. As a preferred option, at the top edge of each screen there may be an about 1 cm to 4 cm wide metal strip 18 substituted for the screen. The screens may be spaced apart any suitable distance, preferably from about 0.5 cm to about 5 cm and may be constructed of fibres, filaments or wires of diameters preferably from about 0.1 mm to about 1 mm. The screen openings have a widely varying mesh size, preferably from about 1 mm to about 10 mm. This arrangement is analogous to that disclosed in WO93/15822. The dusty gas enters the housing 10 through inlet 12, flows in channel 16 and the clean gas is discharged through outlet 14. There are lips 24 at both the inlet and the outlet. The fine particles are carried by the turbulent eddies from the gas flowing in the open passage above the screens into the region occupied by the screens, where the eddies decay and the dust is deposited on the strands of the screens (and on the sheet metal strips at the top edge of the screens) whence, after building up a deposit of sufficient thickness, the deposits fall off the strands towards the bottom of the equipment. The dust removal tray 28 is attached to a heavy steel plate 52 that is shaken with an amplitude of about 1 cm to 3 cm and at a frequency of about 2 Hz via shaft 36, by quick return cam 38, with bellows 34, or other suitable means, serving as seal for the driveshaft 36, and motor 40 drives the cam. The speed ratio of forward-to-reverse stroke is about 2 to 3, resulting in the dust on the tray being propelled to the hopper 46, while the dust collection continues without any interruption. The hopper is emptied through rotary valve 44. The direction of forward stroke is from right to left in FIG. 2. As an alternative, the hopper 46 can be positioned at the other end of housing 10, where the clean gas leaves through outlet 14, instead of at the gas inlet 12 end. In this case, however, the direction of forward stroke is from left to right. An advantage of using screens, instead of plates, is that the surface area accessible to the fine particles to be collected is increased and this can lead to an increased collection efficiency of the particles. The removal of the collected dust from the bottom of the unit by shaking with the help of a quick-return mechanism can also be used when plates, either without "canyons", as disclosed in WO93/15822, or provided with slots, as employed in the first further means of the present invention, are used in the device.

3. Third Further Means, FIGS. 3,4,5,6,7,8,9

In a third further means for effecting particulates separation, there is employed, in place of the plurality of closely-spaced transversed plates, or screens, a carpet of a fibrous web or mat, arranged alongside of the turbulent gas flow in the device. The fibrous web may consist of polyester, fibreglass, metal or ceramic fibres, and it preferably has a porosity (void fraction) from about 0.90 to about 0.999, and consists of fibres of diameters from about 0.001 mm to about 0.1 mm, so as to provide an average distance of approximately 0.5 mm to 2 mm between closest neighbour fibres. The fibres of the mat may be charged with static electricity and/or the mat may be pleated. The thickness of the mat can range from about 1 cm to about 30 cm. This new realisation of the invention is in some ways similar to the second further means, disclosed in this document, but permits the use of much finer collector strands, resulting in larger collector surface area, than those available in screens and it also offers certain constructional and manufacturing advantages. The gas present in the highly porous matting constitutes an expanded viscous boundary layer into which eddies, carrying suspended particulates, penetrate from the turbulent gas flow. The particles are captured by the fibres by all the well-known collection mechanisms. Whereas in conventional filters the gas is made to enter through one face of the filter medium, and emerge through the other face, resulting in considerable pressure loss and in progressive plugging of the medium, in the present invention the bulk of the gas flows alongside of the porous matting in an open channel, assuring high particulate collection efficiency at a steady flow rate, and constant low pressure drop and a high gas velocity.

3 a). In the embodiment of the third further means, shown in FIG. 3, the turbulent flow precipitator comprises a housing 10, an inlet 12 for gas laden with fine particulates and an outlet 14 for clean gas, arranged on a generally horizontal axis, and equipped with lips 24. Inside the housing 10 the gas flows in passage 16, underneath of which there is a carpet consisting of a fibrous mat 30, supported by a wire cage 32, attached to a dust removal tray 28, that is shaken either intermittently or continuously by means of the quick return mechanism described for the embodiment illustrated in FIG. 2, consisting of driveshaft 36, bellows 34, or other suitable seal, quick return cam 38 and motor 40. In experiments, using 10 cm or 15 cm thick fibreglass mat of 99.5% porosity, consisting of about 30 μm diameter fibres, carried out under the same conditions described for the first further means, the collection efficiency increased to 70%. Additional advantages of this embodiment consist of the ease of continuous removal from the device of the dust already collected, and the much lower cost and weight of the mat as compared with the plates.

3 b). The embodiment shown in FIG. 4 is in many constructional features identical to the embodiment illustrated in FIG. 3. It comprises a similar housing 10 with inlet 12 and outlet 14 for the gas, equipped with lips 24, but arranged on an axis oriented by about 70 degrees with respect to the horizontal. The gas flows in channel 16, underneath of which is a carpet of a fibrous mat 30, supported by a wire cage 32, welded to heavy steel plate 52, that is shaken by means of a drive shaft 36, operated by shaking mechanism 50, mounted on support 54 and operating with similar amplitudes and at similar frequencies as those disclosed with reference to the embodiment illustrated in FIG. 2, but not necessarily of the quick return type. Bellows 34, or other suitable means, serve as the seal for the drive shaft 36. The wire cage slides on sliders 26. The dust shaken off the fibres falls into the dust discharge channel 48, and slides down on the floor 20 of the housing 10 under the action of gravity into hopper 46, whence it is discharged via rotary valve 44.

3 c). The third embodiment of the third further means of the invention is illustrated with the side cut open, in FIG. 5. The housing 10, inlet 12 and outlet 14, lips 24, gas flow channel 16, dust removal tray 28 with heavy steel plate 52 attached, sliders 26, bottom 20, quick return mechanism comprising quick return cam 38, driveshaft 36, bellows or other suitable means 34 and motor 40, hopper 46, rotary valve 44, are all identical with the corresponding components of the embodiment described with reference to FIG. 2 of this disclosure. In this embodiment the fibrous web is applied in a belt form which is moved at a slow speed by spindles 56 equipped with sprockets 96. The dust collected by the belt in the upper pass and is dislodged from it by dust removal spindles 76, also equipped with sprockets 104, in the lower pass. The spindles are driven by a motor (not shown).

Dimensions

Typical dimensions of all the embodiments of the invention described above, are as follows. The width of the housing 10, is in the range of 10 cm to 1 m, preferably about 50 cm, the height of the flow channel 16, is in the range of 1 cm to 20 cm, preferably about 5 cm, the thickness of the fibrous mat 30, is in the range of 1 cm to 30 cm, preferably about 10 cm. The length of the housing depends on the task at hand and the collection efficiency desired. The gas velocity in the flow channel 16 is in the range of 1 $ms^{-1}$, to 30 $ms^{-1}$, preferably about 15 $ms^{-1}$. The quick return cam 38 has a forward-to-reverse speed ratio of about 2 to 3, the stroke is about 2 cm and the frequency is about 2 Hz.

3 d). A fourth embodiment of the third further means of the invention, in which fibrous webs or mats of the properties described above are employed, is illustrated in FIG. 6. Here the housing consists of tube 10, with dusty gas inlet 12 and clean gas outlet 14, equipped with valves 78. Inside tube 10, the fibrous web 30 is contained between two concentric tubes, both consisting of a grid of heavy gauge wire or thin metal rods. The tube formed by the inner tubular grid 98 forms the flow channel 16, and it is attached to the outer tubular grid 32 by heavy duty header plate 52. The cage can move up and down in housing 10, guided by two rods 100 which are permanently attached to grid 32 and slide in tracks 102 attached to the inside of housing 10, as shown in FIG. 6b. A cone-shaped sheet 96 connects the bottom end of outer tubular grid 32 with the bottom end of inner tubular grid, forming a funnel. The cage, consisting of tubular grids 32 and 98, the fibrous web packing 30, heavy duty header plate 52 and cone 96 is shaken intermittently in a reciprocating action by the mechanism 50, that may either be of a quick return or of a simple excentric. Drive shaft 36 is attached to heavy duty plate 52 via bellows 34, or other suitable seal. The dust falls into hopper 46 whence it can be discharged via rotary valve 44. The diameter of the inner tubular grid 98 is in the range of 2 cm to 40 cm, preferably about 10 cm to 20 cm, whereas the thickness of the fibrous web pack 30 is in the range of 2 cm to 15 cm, preferably about 5 cm to 10 cm, the gas velocity is in the range of 2 $ms^{-1}$ to 30 $ms^{-1}$. The length of the tubular matting 30 is in the range of 3 m to 30 m, depending on the task at hand. For large gas flows, frequently encountered in industry, a large number of inner tubular grids are attached to the same heavy duty header plate, and the battery of tubes is encased in a large outer grid, the top perimeter of which is attached to the header. The space between the inner tubular grids, the header and the outer grid is packed with a fibrous web. At the bottom of packing, under each inner tube, there is a funnel the top of which is attached to the ribbed bottom of the grid cage. The entire cage slides inside a housing and it is shaken intermittently, in a reciprocating mode, by a shaker placed at the top of housing. The dust is dislodged into a common hopper whence it is discharged through a rotary valve. In experiments, using 10 cm thick layer of fibreglass matting of 99.5% porosity, consisting of about 30 $\mu$m diameter fibres, with an inside diameter of tubular gas channel 16 of 20 cm, length of tube of 3 m, gas velocity in the range between 12 $ms^{-1}$ and 18 $ms^{-1}$ 78% collection efficiency of the ASP200 standard test dust was measured.

Figure 7A:
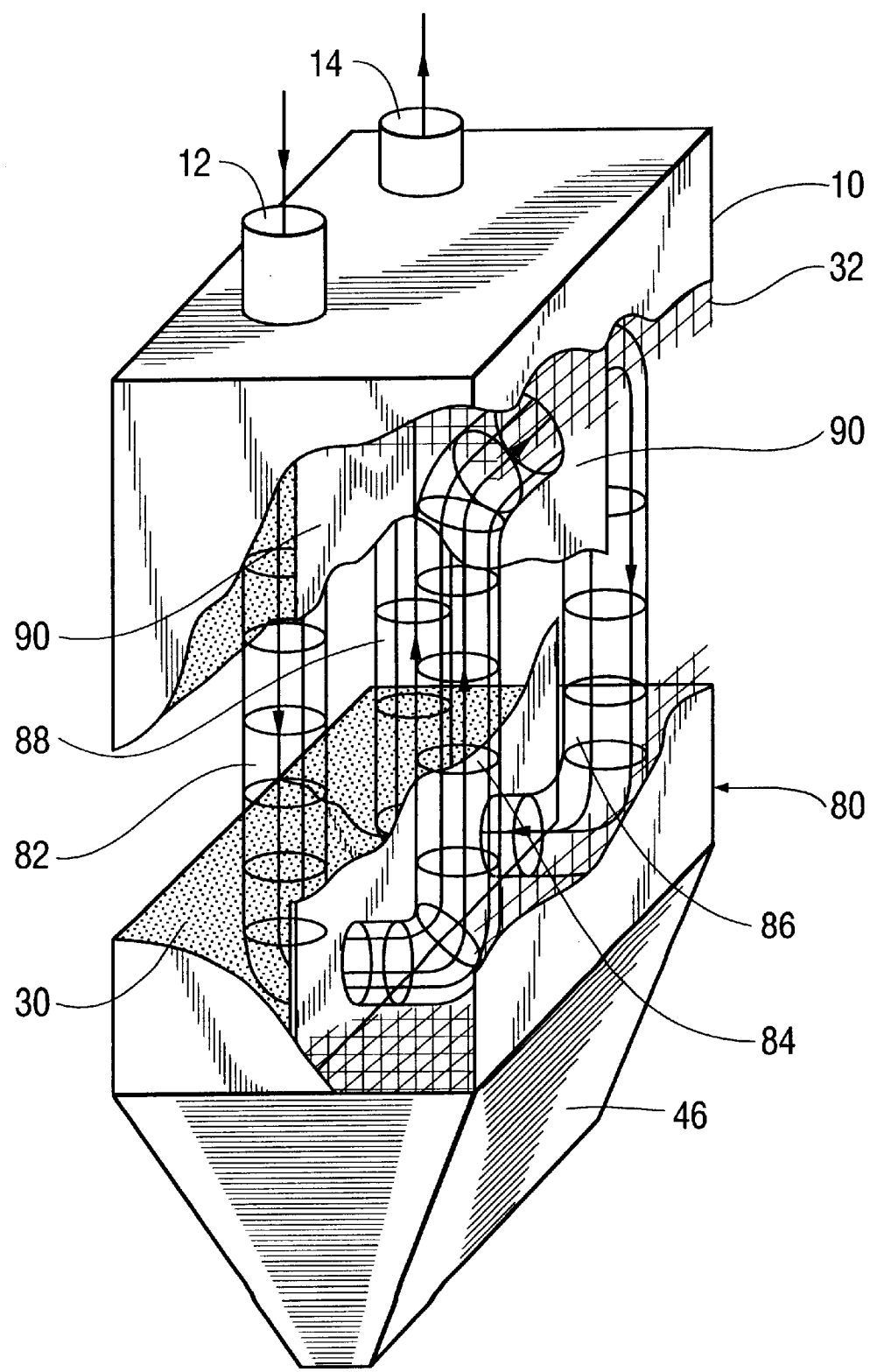
Figure 7B:
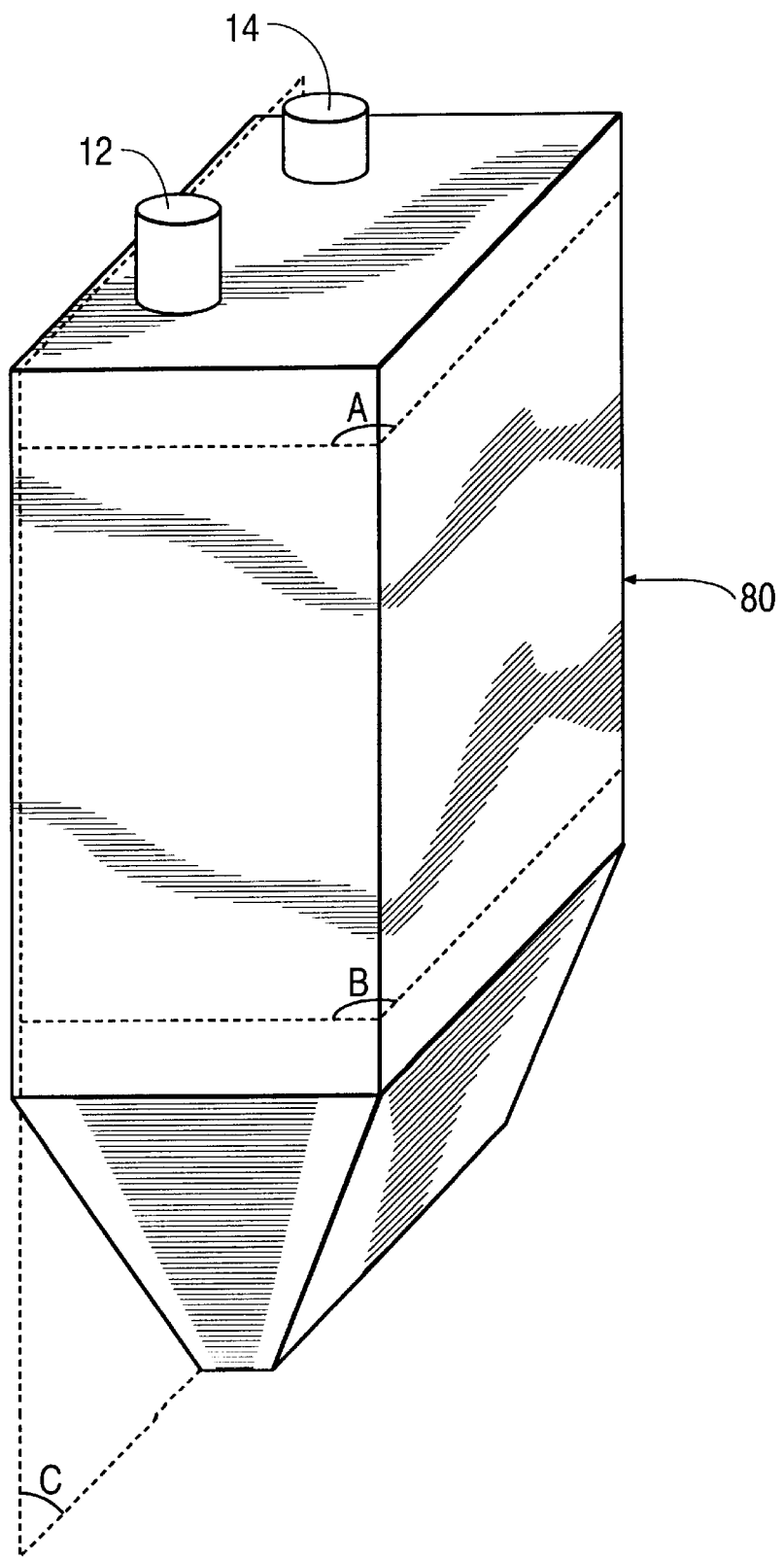
Figure 7C:
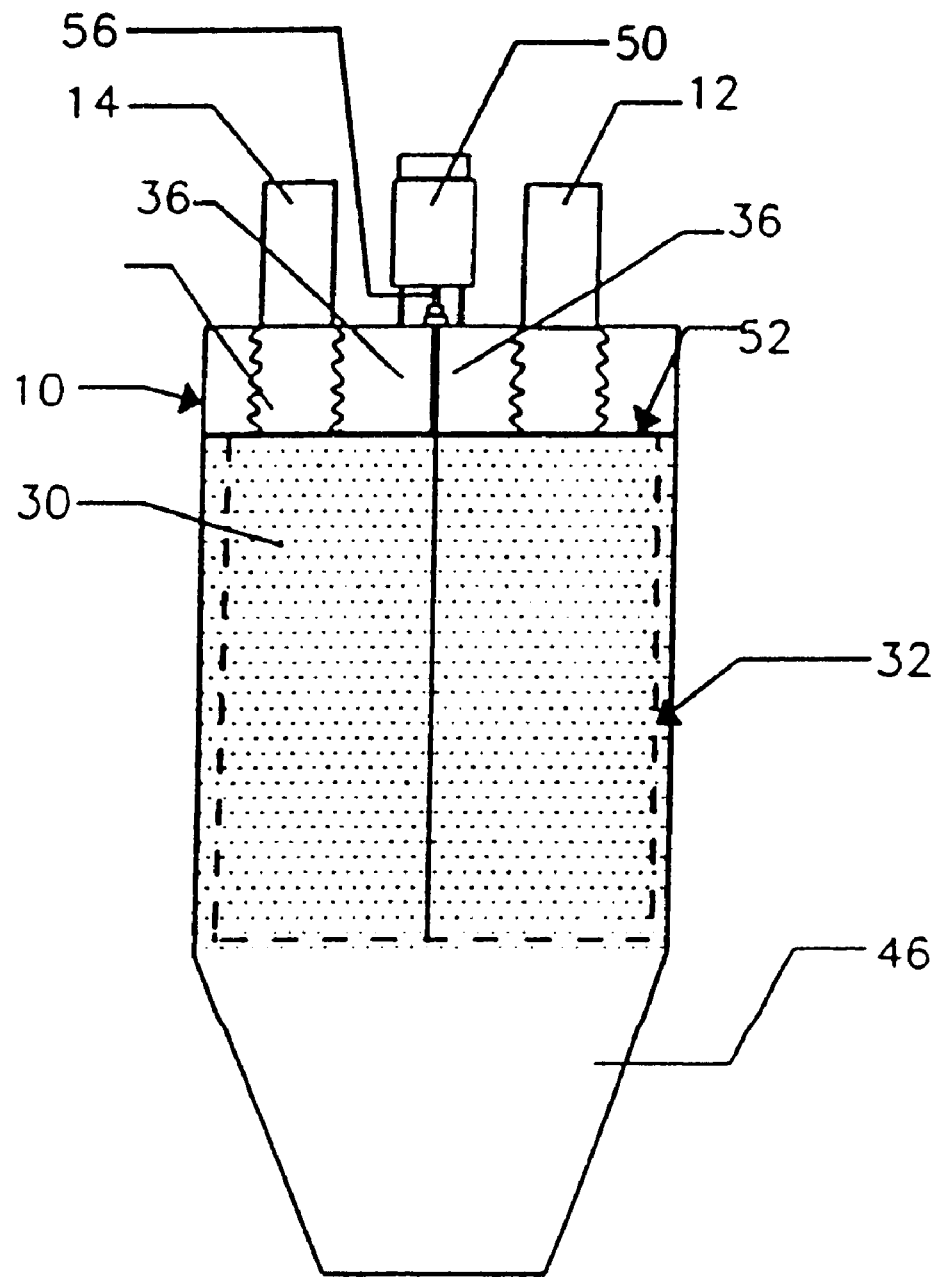
Figure 7D:
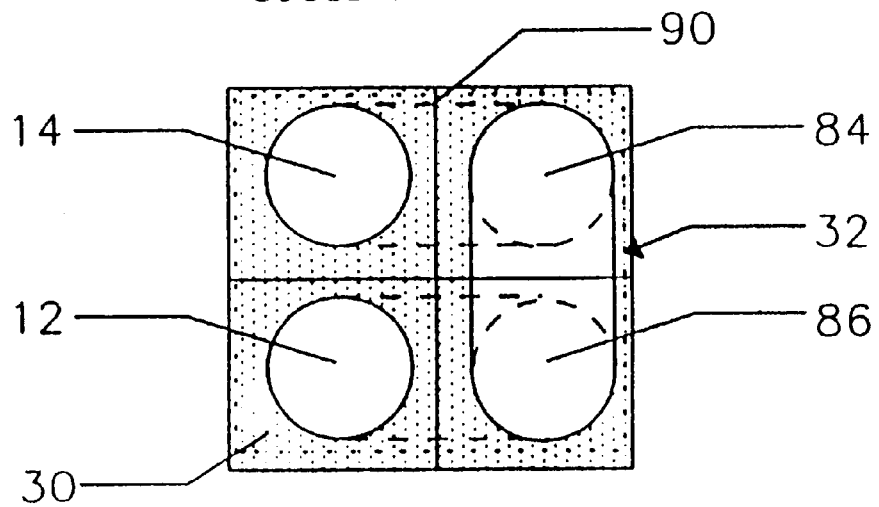
Figure 7E:
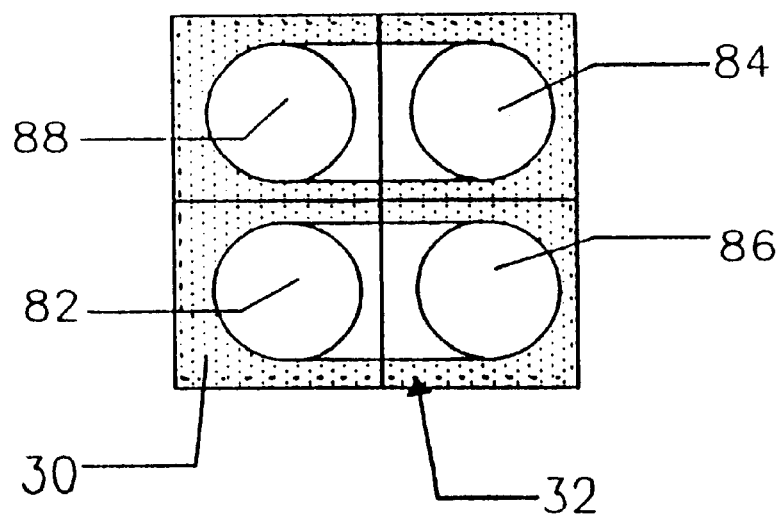

3 e). A fifth embodiment of the third further means of the invention, utilising fibrous webs or mats of the properties described above, illustrated in FIG. 7, comprises a rectangular housing 10 in which there is a loosely fitting rectangular cage 32 divided by impervious partitions 90 into four equal compartments. The dusty gas enters through inlet 12, into a tube made of a heavy gauge wire grid, at first in compartment 82, then it passes into compartment 84, whence into compartment 86, and finally the clean gas leaves compartment 88 through outlet 14. The space between the cage and the tube having a grid wall is packed with a fibrous web. Flexible ducting 108, shown in the sectional view in FIG. 7c, connect the inlet 12 and outlet 14 to both ends of the grid-wall tube. The outside appearance of the box can be seen in FIG. 7b, where the positions of the sections are also indicated. The top of the cage consists of a heavy duty header plate 52, which is connected by drive shaft 56 to a shaker enabling reciprocating up-and-down motion of the cage and its contents. Two horizontal sectional views of the equipment, the positions of which are indicated in FIG. 7b, are illustrated in FIG. 7d. The dust shaken off the fibres falls into hopper 46, whence it is discharged by a variety of possible means, such as for example a screw conveyor. The number of compartments, or passes, in this embodiment is not limited to four, but it can be any number deemed necessary and convenient. The dimensions used in this embodiment are similar to those used in the previous embodiment, illustrated in FIG. 6. This embodiment offers an option to use a device of the same effective flow channel length as the previous embodiment, but of a much smaller height.

3 f). A sixth embodiment of the third further means of the invention, in which fibrous webs or mats of the properties described above are employed, illustrated in FIG. 8, is built of modules consisting of two, about 1 cm to 2 cm thick, framed fibrous mats 30, in upright or in horizontal position, about 1 to 3 cm apart, to form a channel 16, about 50 cm high and about 50 cm long, through which gas/air flows under turbulent conditions. In a preferred form of this embodiment, shown as top elevation in FIG. 8b, the mats 30 are pleated, with the pleats oriented perpendicular to the direction of air flow, and with a pleat angle formed between sides of the pleats at the peaks is an acute angle in a similar manner to the screens oriented in FIG. 2. In FIG. 8b retaining lips 24 at the ends of each passage are also shown. Another novelty in this embodiment consists of dust being collected on both sides of the channel carrying gas/air in turbulent flow. Hence, this embodiment is referred to as a double-sided collector in which the arrangement of the collector mats 30 resembles that of the collector electrodes in plate type electrostatic precipitators. In this embodiment several (in FIG. 8, five) modules of the above description, arranged side-by-side, are connected in series, by U-bends 72, in such a way that the direction of gas/air is changed by 180 degrees every time the air passes from one module into the next one. The dusty gas/air flow enters through inlet 12 and the clean gas/air is discharged through outlet 14. The framed mats are inserted into structure 74, consisting of two front plates and four partitions, contained in box 10. The gas/air is blown in by fan 68, mounted on support 70. This embodiment is of particular advantage for applications in space air cleaning in dwellings and offices, where the particulate loading of the air is low, so that the fibrous mats do not require frequent cleaning. For units requiring extremely high collection efficiencies electrostatically charged collector mats, pleated or flat, could be used, and/or for odour control mats containing a suitable adsorbent, such as active carbon, could be used to replace some of the existing mats. Scaled-up versions of double-sided collectors of this embodiment can be used for industrial gas cleaning. In this case, however, the collector mats require periodic cleaning by shaking or by other suitable means. In a test unit with a flow channel 16 width of 1.3 cm, effective channel 16 length of 2.5 m, pleated fibrous mats 30 thickness of 2.5 cm and an air velocity of 6.5 ms$^{-1}$, 92% collection efficiency of the ASP200 standard test dust was measured. In the same test unit, at the same air velocity, 100% of 5 $\mu$m dust was collected from ambient air in tests in which pleated fibrous mats 30 of 2.5 cm thickness, charged with static electricity, were used.

3 g). The seventh embodiment of the third new means of the invention, using fibrous webs or mats, shown in perspective view in FIG. 9, consists of a spiral configuration of the matting, 30, mounted on an impervious sheet 106. The sheet, with the mat mounted on it, is rolled up in a spiral form, leaving gap 16 between two consecutive turns of the spiral, resulting in two parallel gas channels 16. The spiral turbulent flow precipitator is contained in cylindrical housing 10, with dusty gas inlet 12 in the centre and clean gas outlet 14 arranged tangentially at the outer periphery of the cylinder. In FIG. 9, the lid of the unit, to which the inlet connection is attached, is not shown. This embodiment, as shown in FIG. 9, is also primarily suited for cleaning of air in dwellings and offices, where the dust loading of the air is low. Infrequent, periodic cleaning of the unit is possible by a number of means, including shaking or vacuuming. The width of an air passage is about 1 cm to 3 cm. The mat thickness is about 2 cm to 5 cm, and the height of the unit is about 10 cm to 50 cm. One advantage of the spiral configuration is that in it turbulent conditions appear at lower values of the Reynolds number (i.e. for a given system, at lower gas velocities) than in a straight duct. Scaled-up versions of the spiral turbulent flow precipitator can be used for industrial gas cleaning. In this case, however, the collector mats require periodic cleaning by shaking or by other suitable means. In a test unit with a flow channel 16 width of 1.3 cm, fibrous mat 30 thickness of 2.5 cm, effective channel 16 length of 3 m and an air velocity of 2.5 ms$^{-1}$, 92% collection efficiency of the ASP200 test dust was measured.

Summary

In summary of this invention, there is provided certain novel structures and methods of employing the same, for removal of suspended particulates, generally of a very fine size, from industrial gases or air, in an efficient manner. Modifications are possible within the scope of this invention.

What is claimed is:

1. An apparatus for removing particles from a gas stream containing the particles, comprising:

a housing having an inlet and an outlet;

a plurality of spaced parallel pleated elements provided in said housing and defining flow passages therebetween, pleats of said pleated elements having peaks with a longitudinal axis extending perpendicular to a direction of air flow in the flow passages; and a device for establishing a turbulent flow of said gas stream through said flow passages from said inlet to said outlet;

wherein a pleat angle formed between sides of said pleats at said peaks is an acute angle and wherein said pleated elements are arranged and dimensioned so that a turbulent flow exists in said flow passages except in valleys between adjacent pleats of each pleated element, said valleys forming a viscous boundary layer into which eddies carrying suspended particles penetrate and deposit said suspended particles in said valleys of said pleats.

2. An apparatus according to claim 1, wherein, at each end of said housing, an outlet of one of said flow passages is connected to an inlet of an adjacent flow passage, whereby said flow passages are connected in series and the gas stream changes direction 180° as it passes from each of said flow passages to an adjacent flow passage in series.

3. An apparatus according to claim 1, wherein said pleated elements are charged with static electricity.

* * * * *